(12) United States Patent
Izumi et al.

(10) Patent No.: US 7,951,445 B2
(45) Date of Patent: May 31, 2011

(54) PHOTOCHROMIC OPTICAL ARTICLE AND METHOD OF PRODUCING THE SAME

(75) Inventors: Shinobu Izumi, Shunan (JP); Junji Momoda, Shunan (JP); Hironobu Nagoh, Shunan (JP); Nobumasa Kuwashima, Shunan (JP)

(73) Assignee: Tokuyama Corporation, Shunan-shi (JP)

( * ) Notice: Subject to any disclaimer, the term of this patent is extended or adjusted under 35 U.S.C. 154(b) by 1157 days.

(21) Appl. No.: 10/594,005

(22) PCT Filed: Mar. 23, 2005

(86) PCT No.: PCT/JP2005/006002
§ 371 (c)(1),
(2), (4) Date: Jan. 30, 2007

(87) PCT Pub. No.: WO2005/091055
PCT Pub. Date: Sep. 29, 2005

(65) Prior Publication Data
US 2008/0226883 A1 Sep. 18, 2008

(30) Foreign Application Priority Data

Mar. 24, 2004 (JP) ................................ 2004-087380
Mar. 25, 2004 (JP) ................................ 2004-088377

(51) Int. Cl.
*B32B 7/02* (2006.01)
(52) U.S. Cl. ..................... 428/212; 428/220; 428/411.1; 427/164
(58) Field of Classification Search .................. 428/212, 428/220, 411.1; 427/164
See application file for complete search history.

(56) References Cited

U.S. PATENT DOCUMENTS

| | | | |
|---|---|---|---|
| 5,914,193 A | 6/1999 | Ono et al. | |
| 7,320,826 B2 * | 1/2008 | Kumar et al. | 428/411.1 |
| 2004/0173782 A1 | 9/2004 | Nagoh et al. | |
| 2004/0220292 A1 | 11/2004 | Momoda et al. | |

FOREIGN PATENT DOCUMENTS

| | | |
|---|---|---|
| JP | 6-192651 A | 7/1994 |
| JP | 9-48951 A | 2/1997 |
| JP | 10-10301 A | 1/1998 |
| JP | 2003-128713 A | 5/2003 |
| JP | 2003-342310 A | 12/2003 |
| JP | 2004-050108 A | 2/2004 |
| WO | WO-03/011967 A1 | 2/2003 |
| WO | WO-03/097765 A1 | 11/2003 |
| WO | WO-03/099550 A1 | 12/2003 |

* cited by examiner

*Primary Examiner* — Mark Ruthkosky
*Assistant Examiner* — Lawrence D Ferguson
(74) *Attorney, Agent, or Firm* — Birch, Stewart, Kolasch & Birch, LLP

(57) ABSTRACT

A photochromic optical article comprising an optical substrate having a photochromic layer which is formed on at least one surface thereof and contains a photochromic compound is dispersed in a resin, and a thin metal oxide layer formed on the photochromic layer, wherein an indenonaphthopyran compound is used as the photochromic compound, the photochromic layer having a thickness of 30 to 50 μm, and the thin metal oxide layer has a thickness of 0.01 to 10 μm. The photochromic optical article has excellent photochromic properties, effectively suppresses a decrease in the photochromic properties caused by deterioration due to oxidation and features very excellent photochromic light resistance.

7 Claims, 1 Drawing Sheet

PHOTOCHROMIC OPTICAL ARTICLE AND METHOD OF PRODUCING THE SAME

TECHNICAL FIELD

The present invention relates to a photochromic optical article such as a photochromic plastic lens featuring excellent light resistance and a method of producing the same.

BACKGROUND ART

Photochromic spectacles are the spectacles which, when used outdoors where they are irradiated with light containing ultraviolet rays like sunlight, are quickly colored and work as sunglasses and, when used indoors where they are not irradiated with light, fade colors and work as ordinary transparent spectacles. In recent years, in particular, the photochromic spectacles using photochromic plastic lenses are finding ever increasing demands.

The methods of producing plastic lenses having photochromic properties can be roughly classified into the following three methods (in the following description, ordinary lenses without photochromic properties are simply called lens materials).

(i) A method of directly obtaining photochromic lenses by dissolving a photochromic compound in a monomer to polymerize it (in mass method).

(ii) A method of forming a photochromic layer on the surfaces by imbibing a lens material with a composition containing a photochromic compound (imbibition method).

(iii) A method of forming a photochromic layer on the surfaces by coating the surfaces of the lens material with a composition (photochromic coating agent) in which a photochromic compound is dispersed (coating method).

Among the above methods, the mass method has a limitation in that a special monomer composition must be used for expressing good photochromic properties. According to the imbibition method, the lens material must be so soft that the photochromic compound diffuses therein. In contrast with the above methods, the coating method offers an advantage in that photochromic properties can in principle be imparted to any lens materials, and is drawing particular attention in recent years.

Though the coating method is accompanied by a serious technical problem of firmly adhering the photochromic layer on the lens material, there has now been developed a coating agent capable of forming, on the lens material, a photochromic layer having a highly adhering property and its practical use is becoming a reality. For example, patent document 1 proposes "a curable composition comprising a radically polymerizable monomer having a silanol group or a group capable of forming a silanol group upon the hydrolysis; an amine compound; and a photochromic compound, each in particular amounts" which is used as the above photochromic coating agent.

As described above, the coating method may be a very excellent method of producing photochromic lenses. However, when the lenses having a photochromic layer formed by the coating method are used for extended periods of time, a problem arouses in that a photochromic compound in the photochromic layer is deteriorated to lose color density or turns into yellow causing the lenses to appear in yellow color even in a state of not developing color (even in a state of not being irradiated with ultraviolet rays). In particular, when an indenonaphthopyran compound having good photochromic property is used as a photochromic compound, the deterioration becomes conspicuous. The above problem similarly occurs even with the lenses having a photochromic layer formed thereon by the imbibition method. The main cause of deterioration of the photochromic compound stems from that the photochromic compound comes in contact with oxygen in the atmosphere and is deteriorated by oxidation.

As a method of preventing the photochromic compound in the photochromic layer from being deteriorated by oxidation, patent document 2 proposes forming a thin layer of metal oxide particles or fine metal particles on the surface of the photochromic layer having a thickness of about 20 μm.

Patent document 1: Leaflet of International Laid-Open No. 03/011967
Patent document 2: JP-A-6-192651

DISCLOSURE OF THE INVENTION

The thin layer proposed by the patent document 2 is capable of suppressing the deterioration by oxidation to some extent and of preventing a decrease in the properties of the photochromic layer, which, however, is not still sufficient, and it is desired to further improve photochromic light resistance from the practical point of view. When a compound having good photochromic property, such as indenonaphthopyran compound that is lately developed is used, in particular, a simple use of a thin layer of a metal oxide like in the patent document 2 is not capable of effectively suppressing a decrease in the photochromic properties, and it is difficult to maintain its excellent photochromic properties for extended periods of time.

It is, therefore, an object of the present invention to provide a photochromic optical article having a photochromic layer containing an indenonaphthopyran compound as a photochromic compound formed on the surface of an optical substrate such as a plastic lens, highly suppressing the decrease in the properties of the photochromic layer caused by the deterioration by oxidation, and featuring very excellent photochromic light resistance.

According to the present invention, there is provided a photochromic optical article comprising an optical substrate having a photochromic layer which is formed on at least one surface thereof and contains a photochromic compound dispersed in a resin, and a thin metal oxide layer formed on the photochromic layer, wherein an indenonaphthopyran compound is used as the photochromic compound, the photochromic layer has a thickness of 30 to 50 μm, and the thin metal oxide layer has a thickness of 0.01 to 10 μm and is of a single-layer structure or of a laminated-layer structure of not more than three layers.

According to the present invention, further, there is provided a method of producing a photochromic optical article, comprising:

preparing an optical substrate having a photochromic layer of a thickness of 30 to 50 μm which is formed on at least one surface thereof and contains an indenonaphthopyran compound dispersed in a resin;

forming a thin polysilazane layer on the photochromic layer by applying a coating solution containing polysilazane or by applying polysilazane thereon; and converting polysilazane forming the thin layer into silicon oxide to thereby form a thin silicon oxide layer of a thickness of 0.01 to 10 μm.

The present invention was accomplished based on a novel discovery in that a photochromic layer formed by using a resin in which an indenonaphthopyran compound is dispersed permits photochromic property to decrease by oxidation greatly depending upon the thickness of the photochromic layer, which is a nature that is not found with other photochromic compounds. By selecting the thickness of the photochromic layer to be as relatively great as 30 to 50 μm and by forming a thin metal oxide layer on the photochromic layer having the above thickness, the present inventors have succeeded in effectively suppressing a decrease in the properties of the photochromic layer caused by oxidation and in maintaining excellent photochromic property of the indenonaphthopyran compound for extended periods of time. It is quite an unexpected fact that the properties of the photochromic layer is suppressed from decreasing upon selecting the thickness of the photochromic layer to be relatively great only when the indenonaphthopyran compound is used. The inventors presume the reason to be as described below.

That is, when the photochromic layer in which the indenonaphthopyran compound is dispersed has a small thickness, oxygen that permeates through the photochromic layer cannot be completely shut off despite the thin metal oxide layer is formed, and oxygen diffuses in very small amounts into the whole photochromic layer causing the indenonaphthopyran compound to be oxidized and deteriorated in the whole layer and resulting in a decrease in the photochromic property (i.e., photochromic light resistance is low). For example, when the photochromic layer has a thickness of about 20 μm as in Comparative Example 4 described later, the photochromic light resistance is very small. The photochromic property similarly decreases even when other photochromic compounds are used (Comparative Example 3).

When the photochromic layer in which the indenonaphthopyran compound is dispersed has a thickness of 30 to 50 μm, on the other hand, the photochromic property is greatly suppressed from decreasing as demonstrated in Example 1, and it is learned that the photochromic light resistance is very improved and, particularly, the effect very increases for suppressing the development of yellow color. In the photochromic layers in which other photochromic compounds are dispersed, on the other hand, the photochromic light resistance is not sufficiently improved and the effect is low for suppressing the development of yellow color despite the thickness of the photochromic layer is selected to be 40 μm (Comparative Example 2). This fact tells that the indenonaphthopyran compound that is used possesses resistance against the oxidation (light resistance against being deteriorated by oxidation) as compared to other photochromic compounds. Therefore, upon increasing the thickness of the photochromic layer, oxygen of a very small amount that has permeated through the thin metal oxide layer is shut off by an upper region of the photochromic layer (which is on the side of the thin metal oxide layer), and is suppressed from diffusing into the interior. That is, the deterioration ceases in the upper region and does not proceed to the interior of the photochromic layer or to the lower region thereof (substrate side). Other photochromic compounds have low resistance against oxidation and are subject to be deteriorated with light only. Therefore, the photochromic layer as a whole is deteriorated even if it is thickly formed and, as a result, the photochromic light resistance is not improved.

In the photochromic optical article of the present invention as described above, the properties of the photochromic layer are effectively suppressed from being deteriorated by oxidation and, therefore, very excellent photochromic light resistance is exhibited. Even after used for extended periods of time, therefore, the indenonaphthopyran compound does not develop yellow color in its state of developing no color, and the color density of the indenonaphthopyran compound does not decrease in its state of developing color.

In the present invention, further, the thin metal oxide layer formed on the photochromic layer consists of a single layer or not more than three layers, which is not of a multi-layer structure such as of a reflection-preventing film. Therefore, a great advantage is obtained from the standpoint of cost, and the lenses can be used as general-purpose lenses to a sufficient degree.

According to the production method of the invention, further, a thin layer of a metal oxide (silicon oxide) can be formed on the photochromic layer by such a very simple means as converting polysilazane in the thin polysilazane layer formed by coating on the photochromic layer into silicon oxide, offering a great industrial value without requiring any particular facility as that of the case of employing such means as vacuum evaporation.

BEST MODE FOR CARRYING OUT THE INVENTION

Figure 1:
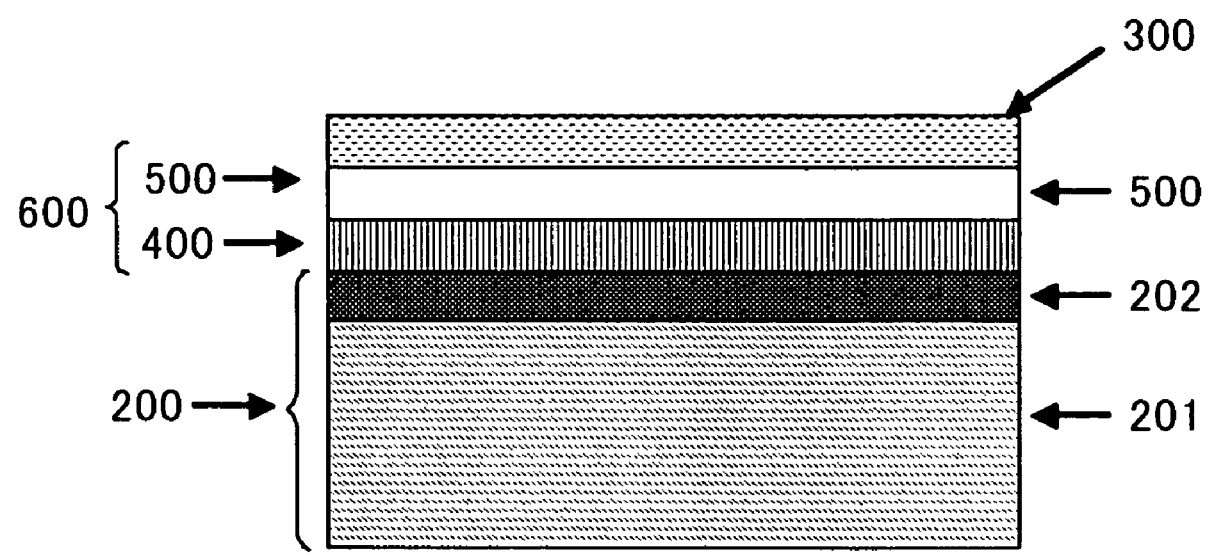
FIG. 1 is a diagram illustrating a sectional structure of a photochromic optical article of the present invention.

Referring to FIG. 1, the photochromic optical article of the present invention has a photochromic substrate which is generally designated at 200. The photochromic substrate 200 has a structure in which a photochromic layer 202 is formed on the surface of an optical substrate 201. Further, a thin metal oxide layer 300 is formed on the photochromic layer 202 via a buffer layer 600. The buffer layer 600 is formed, as required, and the thin metal oxide layer 300 may be formed directly on the photochromic layer 202. In FIG. 1, the buffer layer 600 is constituted by a primer layer 400 and an inorganic fine particle dispersion layer 500. As will be described later, however, the primer layer 400 only may be used as the buffer layer 600 or the inorganic fine particle dispersion layer 500 only may be used as the buffer layer 600. Further, another primer layer 400 may be formed on the inorganic fine particle dispersion layer 500.

As will be described later, the thin metal oxide layer 300 has a single-layer structure or a laminated-layer structure of not more than three layers which, however, is clearly different from a so-called reflection-preventing film. That is, as a means for forming a thin metal oxide layer on the surface of the photochromic layer, there has been proposed a reflection prevention processing that is executed for the lenses of a high grade to decrease the reflection factor on the surface of the lens and to suppress dazzling for better view. The reflection-preventing film formed by the reflection prevention processing has a multi-layer structure in which five to seven thin layers of metal oxides having different refractive indexes are laminated one upon the other according to a predetermined order. The thin metal oxide layer according to the present invention, on the other hand, has not more than three layers even when it has a laminated-layer structure, and does not substantially have a reflection prevention function for lowering the reflection factor on the surface.

[Optical Substrate 201]

The optical substrate 201 is a transparent plate and has a pair of main surfaces, i.e., a front surface and a back surface. The plate may be curved and its thickness does not need to be constant. For example, when the photochromic optical article of the present invention is used as a photochromic lens, the optical substrate 201 has the shape of a lens. The optical substrate 201 does not have photochromic property by itself.

The optical substrate 201 which is a transparent plate may be formed by using any material such as a plastic material or various inorganic materials so far as it maintains transparency and a suitable degree of strength. As the plastic materials, there can be exemplified various thermosetting or thermoplastic resins such as (meth)acrylic resins; polycarbonate resins; allyl resins obtained by curing a diethylene glycol bisallyl carbonate monomer or a diallyl phthalate monomer; thiourethane resins obtained by curing a polyisocyanate monomer or polythiol monomer; urethane resins; thioepoxy resins; polyester resins such as polyethylene terephthalate; olefin resins such as polypropylene, polyethylene and polystyrene; epoxy resins; and vinyl resins such as polyvinyl chloride. As the inorganic materials, there can be exemplified inorganic glass, quartz glass and light-transmitting ceramics.

Further, the optical substrate 201 may have its surfaces treated by primer treatment, plasma treatment or corona discharge treatment in order to improve adhering property to the photochromic layer 202. As the surface treatment, there can be exemplified a chemical treatment by immersion with a basic aqueous solution or with an acidic aqueous solution, a polishing treatment by using a polishing agent, and a plasma treatment by using an atmospheric-pressure plasma and a low-pressure plasma. The surface treatment is particularly effective when the photochromic layer 202 is to be formed by the coating method.

[Photochromic Layer 202]

The photochromic layer 202 formed on the surface of the optical substrate 201 is constituted by a resin in which a photochromic compound is dispersed. Due to the presence of the photochromic layer 202, a color reversibly changes relying upon a predetermined photochromic reaction. In the example of FIG. 1, the photochromic layer 202 is formed on one surface only of the optical substrate 201. Depending upon the use, however, the photochromic layer 202 may be formed on the whole surfaces of the optical substrate 201 of a predetermined shape, or may be formed on one whole surface thereof, or may be formed only partly on one surface thereof.

In the present invention, it is very important to use an indenonaphthopyran compound as the photochromic compound that is dispersed in the photochromic layer 202. This compound is a kind of the chromene compound and was lately developed as a photochromic compound featuring particularly excellent photochromic properties such as rate of developing color and fading color. This compound further exhibits excellent light resistance against deterioration by oxidation. By forming the photochromic layer 202 by using the above indenonaphthopyran compound, the photochromic light resistance can be strikingly improved.

In the present invention, further, it is very important to set the thickness of the photochromic layer 202 to lie in a range of 30 to 50 μm and, particularly, 30 to 40 μm. By setting the thickness of the photochromic layer 202 in which the indenonaphthopyran compound is dispersed to lie in the above range, the indenonaphthopyran compound exhibits light resistance to a sufficient degree against the deterioration by oxidation, and the photochromic light resistance is greatly improved being assisted by the oxygen shut-off function of the thin metal oxide layer 300 that will be described later. For example, when a photochromic compound other than the indenonaphthopyran compound is used, the photochromic property greatly decreases due to deterioration by oxidation, and the photochromic light resistance is not improved. When the thickness of the photochromic layer is smaller than 30 μm, the effect of deterioration by oxidation becomes no longer negligible being caused by a small amount of oxygen that permeates through the thin metal oxide layer 300 despite the indenonaphthopyran compound is used, and the photochromic light resistance is not improved, either. When the thickness of the photochromic layer exceeds 50 μm, further, it becomes economically disadvantageous and the effect of improving the photochromic light resistance decreases, too.

This is presumably due to that defects such as cracks occur, and oxygen of a small amount permeating through the thin metal oxide layer 300 diffuses over the whole photochromic layer 202 due to a physical factor.

As the above-mentioned indenonaphthopyran compound used in the present invention, the one represented by the following formula (1) is particularly preferably used.

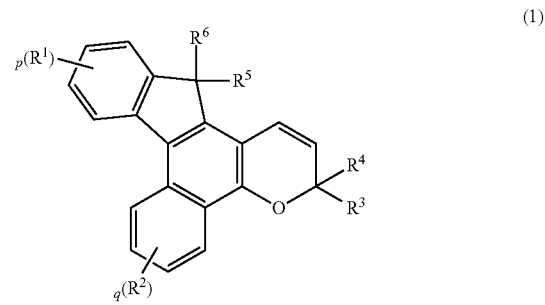

wherein, p and q are integers of 0 to 3, $R^1$ and $R^2$ are, respectively, hydroxyl groups, alkyl groups, trifluoromethyl groups, alkoxy groups, alkoxycarbonyl groups, carboxyl groups, alkoxymethyl groups, hydroxymethyl groups, aralkoxy groups, amino groups, substituted amino groups, cyano groups, nitro groups, halogen atoms, aralkyl groups, substituted or unsubstituted aryl groups, substituted or unsubstituted heteroaryl groups, substituted or unsubstituted heterocyclic groups having a nitrogen atom as a hetero atom and in which the nitrogen is bonded to the ndenonaphtho ring, or condensed heterocyclic groups in which the heterocyclic group is condensed with an aromatic hydrocarbon ring or with an aromatic heterocyclic ring, $R^3$ and $R^4$ are, respectively, substituted or unsubstituted aryl groups, substituted or unsubstituted heteroaryl groups, alkyl groups, groups represented by the following formula (2) or (3),

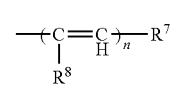

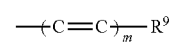

or $R^3$ and $R^4$ together may constitute an aliphatic hydrocarbon cyclic group or an aromatic hydrocarbon cyclic group, $R^5$ and $R^6$ are, respectively, hydrogen atoms, hydroxyl groups, alkyl groups, trifluoromethyl groups, alkoxy groups, alkoxycarbonyl groups, carboxyl groups, alkoxymethyl groups, hydroxymethyl groups, aralkoxy groups, amino groups, substituted amino groups, cyano groups, nitro groups, halogen atoms, aralkyl groups, substituted or unsubstituted aryl groups, substituted or unsubstituted heteroaryl groups, or $R^5$ and $R^6$ together may form a substituted or unsubstituted aliphatic hydrocarbon cyclic group or a substituted or unsubstituted heterocyclic group having one or two hetero atoms in the ring, wherein the aliphatic hydrocarbon cyclic group or the heterocyclic group may be condensed with a substituted or unsubstituted aryl group or with a substituted or unsubstituted heteroaryl, wherein in the above formulas (2) and (3), $R^7$ is a substituted or unsubstituted aryl group, or a substituted or unsubstituted heteroaryl group, R[8] is a hydrogen atom, an alkyl group or a halogen atom,
n is an integer of 1 to 3,
R[9] is a substituted or unsubstituted aryl group, or a substituted or unsubstituted heteroaryl group, and
m is an integer of 1 to 3.

In the present invention, the indenonaphthopyran compound represented by the above formula (1) can be used in a single kind or in two or more kinds in combination. Among the indenonaphthopyran compounds, it is desired to use indenonaphthopyrans A to D expressed by the following formulas (4) to (7) from the standpoint of photochromic properties such as color density and fading rate, and light resistance.

Indenonaphthopyran A:

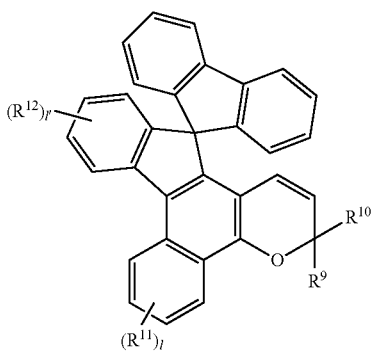

(4)

wherein $R^9$ and $R^{10}$ are as defined by $R^3$ and $R^4$ in the above formula (1), $R^{11}$ and $R^{12}$ are as defined by $R^1$ in the above formula (1), and l and l' are, respectively, integers of 0 to 2.

Indenonaphthopyran B:

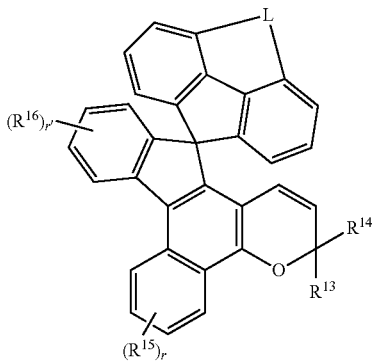

(5)

wherein r and r' are, respectively, integers of 0 to 2, $R^{13}$ and $R^{14}$ are as defined by $R^3$ and $R^4$ in the above formula (1), $R^{15}$ and $R^{16}$ are as defined by $R^1$ in the above formula (1), and L is a group represented by any one of the following formulas,

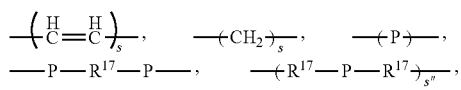

[P is an oxygen atom or a sulfur atom, $R^{17}$ is an alkylene group having 1 to 6 carbon atoms, and s, s' and s" are, respectively, integers of 1 to 4.]

Indenonaphthopyran C:

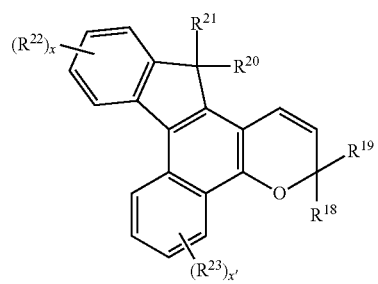

(6)

wherein $R^{18}$ and $R^{19}$ are as defined by $R^3$ and $R^4$ in the above formula (1), $R^{20}$ and $R^{21}$ are, respectively, alkyl groups, hydroxyl groups or alkoxyl groups, $R^{22}$ and $R^{23}$ are as defined by $R^1$ in the above formula (1), and x and x' are, respectively, integers of 0 to 2.

Indenonaphthopyran D:

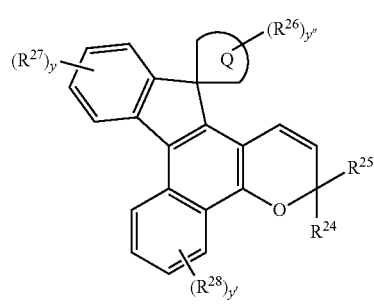

(7)

wherein $R^{24}$ and $R^{25}$ are as defined by $R^3$ and $R^4$ in the above formula (1), $R^{26}$, $R^{27}$ and $R^{28}$ are as defined by $R^1$ in the above formula (1), the ring Q is an aliphatic hydrocarbon cyclic group, and y, y' and y" are, respectively, integers of 0 to 2.

Among the indenonaphthopyrans A to D described above, the indenonaphthopyran compound that is most preferably used in the present invention is the one in which the group $R^3$ or a group corresponding to $R^4$ in the formula (1) has a substituted or unsubstituted amino group. For example, an indenonaphthopyran expressed by the following formula (8) is most desired,

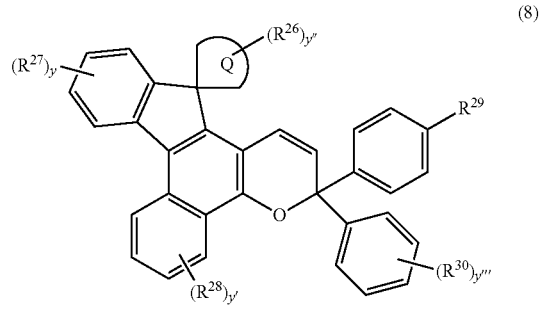

(8)

wherein $R^{26}$, $R^{27}$ and $R^{28}$ the ring Q, and y, y' and y" are as defined in the formula (7), $R^{29}$ is a dialkylamino group, or a substituted or unsubstituted heterocyclic group having a nitrogen atom as a hetero atom and in which the hydrogen atom is bonded to the phenyl group, $R^{30}$ is as defined by $R^1$ in the above formula (1), and y'" is an integer of 0 to 2.

It is desired that the content of the indenonaphthopyran compound in the photochromic layer 202 is in a range of 0.1 to 20% by mass from the standpoint of obtaining a favorable color density and light resistance. To further improve the light resistance and to decrease the initial color, it is particularly desired that the content thereof is in a range of 1 to 10% by mass.

In order to adjust the color tone of the photochromic lens into a neutral tint such as grey or brown, further, the photochromic layer 202 may further contain other photochromic compounds dispersed therein in addition to the indenonaphthopyran compound. As the other photochromic compounds, there can be used known photochromic compounds such as fulgimide compound, spirooxazine compound and chromene compound in one kind or in a combination of two or more kinds depending upon the color tone to be developed together with the indenonaphthopyran compound.

As the fulgimide compound, spirooxazine compound and chromene compound, there can be used the compounds disclosed in, for example, JP-A-2-28154, JP-A-62-288830, WO94/22850 and WO-96/14596. There can be further used those photochromic compounds that are disclosed in JP-A-2001-114775, JP-A-2001-031670, JP-A-2001-011067, JP-A-2001-011066, JP-A-2000-347346, JP-A-2000-344762, JP-A-2000-344761, JP-A-2000-327676, JP-A-2000-327675, JP-A-2000-256347, JP-A-2000-229976, JP-A-2000-229975, JP-A-2000-229974, JP-A-2000-229973, JP-A-2000-229972, JP-A-2000-219687, JP-A-2000-219686, JP-A-2000-219685, JP-A-11-322739, JP-A-11-286484, JP-A-11-279171, JP-A-10-298176, JP-A-09-218301, JP-A-09-124645, JP-A-08-295690, JP-A-08-176139 and JP-A-08-157467.

Among various photochromic compounds used in combination with the indenonaphthopyran compound according to the present invention, it is desired to use a chromene compound from the standpoint of improving photochromic light resistance, maintaining favorable color density and fading rate, and without impairing excellent properties of the indenonaphthopyran compound. Concrete examples of the chromene compound have been disclosed in the leaflet of International Patent Laid-Open No. 94/22850, leaflet of International Patent Laid-Open No. 98/45281, U.S. Pat. No. 5,932,725 and U.S. Pat. No. 6,525,194. The most preferred chromene compounds are those exemplified below.

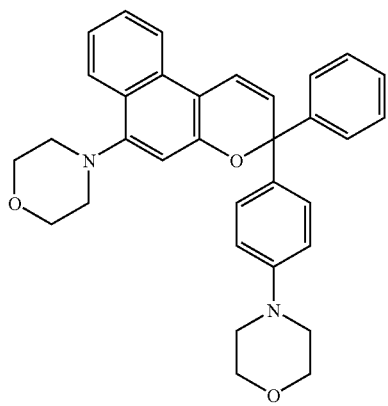

-continued

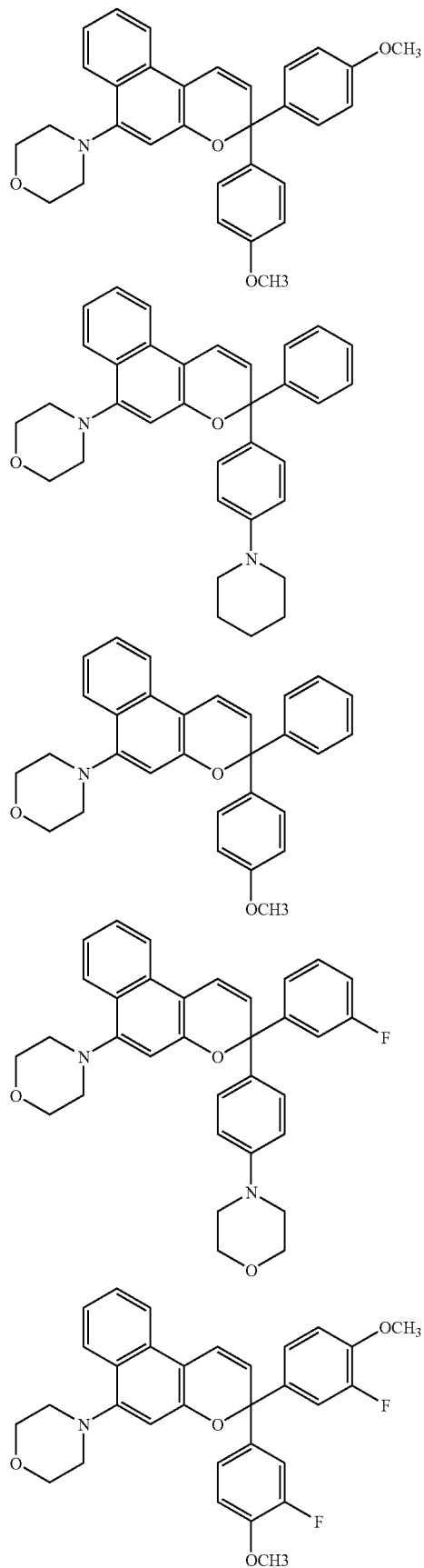

Other photochromic compounds should be used in amounts that do not impair the above excellent properties of the indenonaphthopyran compound. It is, usually, desired that the content of the indenonaphthopyran compound in the photochromic layer 202 is not larger than 75% by mass.

In the present invention, the photochromic layer 202 can be formed on the surface of the optical substrate 201 by the known imbibition method or the coating method.

According to the imbibition method, a coating solution is prepared by dissolving or dispersing the above photochromic compound (indenonaphthopyran compound) together with a resin that serves as a binder in a predetermined organic solvent, and the optical substrate 201 is immersed in the coating solution to form a film of the coating solution followed by drying thereby to form the photochromic layer 202. Desirably, an imbibition method disclosed in U.S. Pat. No. 5,739,243 can be employed. According to the coating method, on the other hand, a known coating agent comprising a curable composition containing a photochromic compound and a polymerizable monomer is applied onto the surface of the optical substrate 201 (as required, the surface is treated as described above) and is cured by polymerization to thereby form the photochromic layer 202. As the coating agent, in particular, the one comprising a curable composition disclosed in, for example, the leaflet of International Patent Laid-Open No. 03/011967 is preferably used. According to the present invention as described already, it is desired to form the photochromic layer 202 by the coating method from the standpoint of little limitation on the optical substrate 201.

When the photochromic layer 202 is to be formed by the coating method, the photochromic compound and, particularly, the indenonaphthopyran compound in the coating agent (curable composition) is so blended that the content thereof in the photochromic layer 202 formed by curing is within the above-mentioned range. It is further desired that the viscosity (20° C.) of the coating agent is in a range of 20 to 1000 cP and, particularly, 50 to 500 cP so that the thickness of the photochromic layer 202 is adjusted to lie in the above-mentioned range (30 to 50 μm). As the polymerizable monomer in the coating agent, further, there can be used a variety of radically polymerizable monomers. From the standpoint of improving adhesion to the optical substrate 201, however, it is desired to use an epoxy monomer such as glycidyl acrylate or glycidyl methacrylate, and a silyl-type monomer having a silanol group in the molecules thereof or having, in the molecules thereof, a group that forms a silanol group upon the hydrolysis, such as γ-methacryloyloxypropyltrimethoxysilane as part of the radically polymerizable monomer.

The above coating agent may be blended with a radical polymerization initiator such as various peroxides or azo compounds and a photo polymerization initiator such as benzoinmethyl ether depending upon the form of curing by polymerization and may, further, be added with additives such as curing catalyst, surfactant, antioxidant, radical-trapping agent, ultraviolet ray stabilizer, ultraviolet ray absorber, releasing agent, anti-tinting agent, antistatic agent, fluorescent dye, dye, pigment, perfume, plasticizer and the like in order to improve light resistance of the photochromic compound, color-developing rate, fading rate and adhering property or for adjusting color tone.

In order for the radically polymerizable monomer to exhibit particularly distinguished effect for improving light resistance as contemplated by the invention and from the standpoint of obtaining good photochromic property and good adhesive property of the photochromic resin layer, it is desired that per 100 parts by weight of the whole radically polymerizable monomers, there are blended:

A) 0.1 to 30 parts by weight of an epoxy-type monomer and/or a silyl-type monomer;
B) 5 to 65 parts by weight of an intermediately hard or highly hard monomer containing at least 5 parts by weight of a monomer having three or more radically polymerizable groups; and
C) 5 to 90 parts by weight of a lowly hard monomer;

Here, as for the highly, intermediately and lowly hard monomers of B) and C), the homopolymers having an L-scale Rockwell hardness of not smaller than 60 and, particularly, 65 to 130 can be classified to be highly hard monomers, and the homopolymers having an L-scale Rockwell hardness of not larger than 40 can be classified to be lowly hard monomers. Further, the homopolymers having an L-scale Rockwell hardness of larger than 40 but smaller than 60 can be defined to be intermediately hard monomers. The highly hard monomer works to increase the resistance of the cured body after cured against dissolving in a solvent, and to increase its hardness and heat resistance. The lowly hard monomer works to toughen the cured body and to increase the fading rate of the photochromic compound. Upon incorporating the intermediately hard monomer, as required, further, a photochromic resin of the invention is provided featuring excellently improved light resistance. photochromic property and strength.

Here, the L-scale Rockwell hardness stands for the hardness measured according to JIS-B7726. By measuring the homopolymers of the monomers, it is allowed to easily judge whether the above conditions of hardness are satisfied. Concretely speaking, the monomer is polymerized to obtain a cured body thereof of a thickness of 2 mm, which is held in a room maintained at 25° C. for one day, and the L-scale Rockwell hardness thereof is measured by using the Rockwell hardness tester to easily make sure. The polymer put to the measurement of the L-scale Rockwell hardness is the one obtained by the casting polymerization under a condition in which not less than 90% of the polymerizable groups possessed by the monomer that is fed undergo the polymerization. The L-scale Rockwell hardness of the cured body polymerized under the above conditions is measured as a nearly constant value.

The above highly hard monomer, lowly hard monomer and intermediately hard monomer may be the same as the highly hard monomer, lowly hard monomer and intermediately hard monomer that are disclosed in International Patent Laid-Open No. 03/011967 described above.

The epoxy-type monomer or the silyl-type monomer works to improve adhesion to the primer layer, to the hard coated layer or to other constituent elements. In order to further improve the adhering property, it is particularly desired to use a curing catalyst comprising an amine compound. The curing catalyst is desirably blended in an amount in a range of 1 to 10 parts by weight per 100 parts by weight of the radically polymerizable monomer.

The above coating agent has been disclosed in detail in the documents (leaflet of International Patent Laid-Open No. 03/011967, Japanese Patent Application No. 2002-354291 and Japanese Patent Application No. 2002-372835) proposed by the present inventors as preferred coating agents for producing photochromic lenses relying on the coating method.

[Thin Metal Oxide Layer 300]

The thin metal oxide layer 300 is formed for shutting off oxygen from permeating into the photochromic layer 202 and has a thickness in a range of 0.01 to 10 μm. When the thickness is smaller than this range, barrier property against oxygen decreases and it becomes difficult to improve the photochromic light resistance. When the thickness is larger than this range, appearance of the thin layer 300 becomes defective, such as developing cracks.

The thin metal layer 300 may be formed by using various metal oxides so far as its transparency is maintained. For example, the thin metal oxide layer 300 is formed by using silicon oxide, titanium oxide, zirconium oxide, tin oxide, zinc oxide, cerium oxide, iron oxide or a composite metal oxide containing these oxide components. Among them, it is desired to use at least one kind of metal oxide selected from the group consisting of silicon oxide, titanium oxide, zirconium oxide, tin oxide and zinc oxide, a titanium oxide/zirconium oxide/tin oxide composite metal oxide or a titanium oxide/zirconium oxide/silicon oxide composite metal oxide from the standpoint of causing no tint. Or, from the standpoint of improving light resistance against the exposure to sunlight, it is particularly desired to use a thin layer formed by using at least one selected from the group consisting of silicon oxide, titanium oxide and zinc oxide and, most desirably, to use a thin layer of silicon oxide. The thin layer 300 is usually of a single-layer structure but may be formed in a laminated-layer structure of not more than three layers so far as the thickness thereof lies within the above-mentioned range. As described earlier, therefore, the thin metal oxide layer 300 is obviously different from the reflection-preventing film having a laminated-layer structure of not less than five layers, and is advantageous from the standpoint of cost since it can be simply formed as compared to the reflection-preventing film.

There is no particular limitation on the method of forming the above thin metal oxide layer, and any known method can be used like evaporation method such as chemical vapor deposition method (CVD), physical vapor deposition method (PVD) or vacuum evaporation method; optical vapor phase growing method; or dry-etching method. Among them, the evaporation method is most desired from the standpoint of forming a film at a temperature lower than the heat-resisting temperature of the optical substrate. When the thin metal oxide layer 300 is to be formed by the evaporation method, it is desired that the thickness thereof is in a range of, desirably, 0.01 to 1 μm and, particularly desirably, 0.01 to 0.5 μm. When the thin metal oxide layer 300 is formed by using silicon oxide, further, the following conversion method can be preferably employed.

According to the conversion method, a thin layer of polysilazane which is a precursor of silicon oxide is formed in advance on the photochromic layer, and polysilazane is converted into silicon oxide to form the thin silicon oxide layer 300. Namely, the thin silicon oxide layer can be easily formed without using any particular apparatus that is used by the evaporation method. Therefore, the conversion method is industrially very useful.

The thin polysilazane layer can be easily formed by applying a coating solution containing polysilazane onto the photochromic layer 202 formed on the surface of the optical substrate 201 followed by drying, as required.

Polysilazane used as a precursor of the silicon oxide is a compound (inclusive of polymer) having, in the molecules thereof, a plurality of constituent units expressed by the following formula,

wherein R is a hydrogen atom or an organic group, and the plurality of groups R present in the molecules may be different from each other. As polysilazane preferably used in the present invention, there can be exemplified perhydropolysilazane (polysilazane of the type in which the groups R are all hydrogen atoms without containing organic group); polysilazane of the type in which a hydrocarbon group such as alkyl group, alkenyl group, aryl group or cycloalkyl group is bonded to a silicon atom; polysilazane of the type in which a hydrolyzable group such as alkoxy group is bonded to a silicon atom; and a polysilazane of the type in which the groups R bonded to the nitrogen atom are organic groups such as alkyl groups. Here, the hydrocarbon group bonded to the silicon atom may have hydrogen atoms which are at least partly substituted with a substituent such as halogen atom, hydroxyl group, alkyl group or amino group. In the present invention, the most preferred polysilazane is a perhydropolysilazane from such a standpoint that it can be easily converted into a polysiloxane (silica) and that the layer after converted is dense.

Polysilazane is usually a polymer in which a silazane chain consisting of the above constituent units is a straight chain or a cyclic or crosslinked structure and, preferably, has a number average molecular weight of 200 to 50,000. When the number average molecular weight is smaller than 200, the layer formed by being converted into silicon oxide (polysiloxane) tends to become non-uniform. When the number average molecular weight exceeds 50,000, on the other hand, polysilazane dissolves little in a solvent or causes the viscosity of the coating solution thereof to increase, which is not desirable.

Polysilazane only can be used as a coating solution when it has a low molecular weight and a low viscosity. From the standpoint of applicability for forming a uniform layer, however, it is desired that the coating solution is obtained by diluting polysilazane with a solvent. Any known solvent can be used as a diluent without limitation provided it has no active hydrogen atom and does not react with polysilazane. For example, there can be used hydrocarbons such as pentane, heptane, octane, cyclohexane, toluene, xylene, terpene or solvesso; halogenated hydrocarbons such as methylene chloride and chloroform; ketones such as acetone, methyl ethyl ketone; ethers such as isopropyl ether, dibutyl ether, dioxane and tetrahydrofuran; and esters such as n-propyl acetate and diethylene glycol monoacetate. The concentration of polysilazane in the coating solution obtained by diluting polysilazane with a solvent is selected depending upon the number average molecular weight of polysilazane and the thickness of the desired thin silicon oxide layer, so that a suitable viscosity is exhibited, and is, usually, selected to be in a range of 0.1 to 30% by mass and, particularly, 1 to 20% by mass. Polysilazane coating solution has been placed in the market by CLARIANT JAPAN Co. in the name of, for example, AQUAMICA. There can be preferably used those of the grades of NL110A, NL120A, NL150A, NP110, NP140, SP140 and UP140.

It is desired that the coating solution is blended with a converting catalyst for converting polysilazane into the silicon oxide at a low temperature as will be described below. As the conversion catalyst, there can be exemplified fine metal particles such as of gold, palladium, silver, platinum or nickel, or a carboxylic acid complex thereof. The conversion catalyst is usually used in an amount of 0.01 to 5 parts by mass per 100 parts by mass of polysilazane. The coating solution may be further blended with a conversion accelerator for quickly converting polysilazane into the silicon oxide at a low temperature. As the conversion accelerator, there can be used alkylamines such as trimethylamine, triethylamine and tripropylamine, and amines such as pyridine, pyrimidine, pyridazine, DBU (1,8-diazabicyclo[5,4,0]7-undecene), and DBN (1,5-diazabicyclo[4,3,0]5-nonene). The conversion accelerator is usually used in an amount of 0.01 to 5 parts by mass per 100 parts by mass of polysilazane.

The coating solution is applied onto the photochromic layer 202 by spin-coating or dipping and is, as required, dried to remove the solvent to thereby form a thin polysilazane layer. Polysilazane content in the thin layer is not smaller than 90% by mass, desirably, not smaller than 95% by mass and, most desirably, not smaller than 98% by mass per the solid content. It is desired that the above-mentioned conversion catalyst and the conversion accelerator are used in amounts which make it possible to maintain the above polysilazane content. Further, the thickness of the coating solution is so set that the thickness of the silicon oxide layer that is finally obtained lies in the above-mentioned range.

A desired silicon oxide layer is obtained by subjecting the thus formed thin polysilazane layer to the conversion treatment.

That is, the conversion treatment is to convert the above-mentioned silazane unit (Si—NR—Si) into the siloxane unit (Si—O—Si), and is conducted relying upon the heat treatment and/or the humidifying treatment, so that the silazane unit is converted into the siloxane unit upon reacting with oxygen or water. Further, the conversion treatment involves limitation on the heat resistance of the photochromic layer 202 and the optical substrate 201. Therefore, the treating temperature is limited and the heating temperature is not higher than 130° C. or not higher than 120° C. (the above-mentioned conversion catalyst and the conversion accelerator are used to conduct the conversion treatment by heating at such a low temperature).

In the present invention, the conversion treatment is preferably carried out by effecting the heat treatment in the atmosphere, usually, at 110 to 120° C. for 1 to 2 hours or by holding the thin polysilazane layer in a humidifying atmosphere of a temperature of 50 to 95° C. and a humidity of 80% to 100% for 1 to 48 hours, though it may vary depending upon the catalyst that is used. Further, the humidifying treatment may be conducted following the above heat treatment.

Thus, polysilazane is converted into the silicon oxide (polysiloxane) to form the desired silicon oxide layer. In this case, the unreacted silazane units may remain so far as they do not adversely affect the oxygen shut-off function of the silicon oxide layer that is formed. For example, the silazane units may remain in an amount of not larger than 20 mol % of the silazane units contained in polysilazane, particularly, not larger than 10 mol % thereof and, most desirably, not larger than 5 mol % thereof. Further, the siloxane bond in the silicon oxide layer may be partly cleaved and may exist in a state of Si—OH bond.

When the silicon oxide layer is formed by the above conversion method, it is usually desired that the thickness thereof is 0.02 to 10 μm and, particularly, 0.02 to 1 μm. When the silicon oxide layer is to be formed by the conversion method, it is desired that the surface of the photochromic layer 202 is treated like that of the above-mentioned optical substrate 201 to improve adhesion to the silicon oxide layer (or to the thin polysilazane layer).

[Buffer Layer 600]

In the present invention, the above-mentioned thin metal oxide layer 300 can be formed directly on the photochromic layer 202 but may also be formed via the buffer layer 600 as shown in FIG. 1. Particularly, the buffer layer 600 is desirably formed when the thin metal oxide layer 300 is to be formed by the evaporation method. That is, the above-mentioned indenonaphthopyran compound is a photochromic compound having excellent photochromic property. Here, when the thin metal oxide layer 300 is formed by the evaporation method directly on the photochromic layer 202 in which the photochromic compound is dispersed, there occurs a phenomenon in that the response speed of photochromic property decreases. This phenomenon becomes conspicuous when the indenonaphthopyrans A to D are used. The response speed decreases most greatly when there are used indenonaphthopyrans in which a group corresponding to $R^3$ or $R^4$ in the formula (1) is an amino group. In these indenonaphthopyrans, the degree of freedom of molecules is greatly limited by the thin metal oxide layer 300 that is densely formed by evaporation and, as a result, the photochromic response speed greatly decreases. By interposing the buffer layer 600 between the photochromic layer 202 and the thin metal oxide layer 300, therefore, the degree of freedom of the photochromic compound is not limited by the thin metal oxide layer 300, and a decrease in the response speed is effectively avoided.

Therefore, the buffer layer 600 should have a thickness within a range of 0.1 to 20 μm. When the thickness is smaller than 0.1 μm, a suitable degree of freedom is not given to the photochromic compound, and the response speed decreases due to the thin metal oxide layer 300. When the thickness exceeds 20 μm, on the other hand, defect occurs such as developing cracks and, besides, the effect does not increase for suppressing a decrease in the response speed.

In the present invention, the buffer layer 600 may be a primer layer or an inorganic fine particle dispersion layer, or a laminated-layer structure of the primer layer and the inorganic fine particle dispersion layer may be used as the buffer layer 600 so far as the total thickness thereof lies within the above-mentioned range. As shown in, for example, FIG. 1, the buffer layer 600 may be of the laminated-layer structure obtained by forming the inorganic fine particle dispersion layer 500 on the primer layer 400 or by further forming a primer layer 400 on the inorganic fine particle dispersion layer 500.

The primer layer 400 that works as the buffer layer 600 is formed by using a known primer in order to improve adhering property and shock resistance. Namely, the primer layer 400 is formed by using a coating solution containing a primer such as epoxy resin, urethane resin or acrylic resin, and by applying the coating solution by spin-coating or dipping, followed by heating. The thickness of the primer layer 400 is usually about 1 to about 5 μm.

The inorganic particle dispersion layer 500 working as the buffer layer 600 is obtained by dispersing inorganic particles in the binder resin, and has inorganic particles dispersed therein and, hence, exhibits high adhering property to the thin metal oxide layer 300 formed by evaporation. The inorganic particle dispersion layer 500 is formed by applying a coating agent comprising chiefly colloidal particles of an inorganic compound and a hydrolyzable organosilicon compound or a hydrolyzed product thereof that serves as a binder, like a silicone coating agent, followed by curing.

As the colloidal particles of an inorganic compound in the coating agent, there can be exemplified those of metal oxides such as silicon oxide, zinc oxide, cerium oxide, zirconium oxide, iron oxide and titanium oxide, as well as composite oxides including metal oxides thereof. It is desired that the colloidal particles of the inorganic compound are contained in the coating agent in an amount, calculated as a solid component thereof, of 20 to 70% by mass and, particularly, 30 to 60% by mass. When the content of the colloidal particles is not smaller than the above range, the adhesion tends to decrease between the inorganic particle dispersion layer 500 and the photochromic layer 202 or the primer layer 400 and, depending upon the cases, the function of the buffer layer decreases when the inorganic particle dispersion layer 500 is directly formed on the photochromic layer 202, deteriorating the function for preventing a decrease in the response of the photochromic compound.

As the organosilicon compound that can be hydrolyzed or as the hydrolyzed product thereof, there can be preferably used those that are usually used as silane coupling agents. Concrete examples of the organosilicon compound include γ-methacryloyloxypropyltrimethoxysilane, γ-methacryloyloxypropyltriethoxysilane, vinyltrialkoxysilane, allyltrialkoxysilane, γ-glycidoxypropyltrialkoxysilane, β-(3,4-epoxycyclohexyl)ethyltrialkoxysilane, γ-aminopropyltrialkoxysilane, tetramethoxysilane, tetraethoxysilane, tetrapropoxysilane and tetraacetoxysilane. It is desired that the binder comprising the above organosilicon compound or a hydrolyzed product thereof is blended in the coating agent in an amount, calculated as a solid component thereof, of about 30 to about 80% by mass.

The above silicone coating agent may further contain other additives such as an acid, a leveling agent or a curing catalyst in addition those described above and may, further contain an organic solvent.

The acid is used for accelerating the hydrolysis and condensation of the organosilicon compound that serves as a binder, and a mineral acid such as hydrochloric acid is preferably used. The acid is usually used in an amount of 1 to 10 millimols per mole of the organosilicon compound.

The organic solvent is used for improving the applicability by adjusting the viscosity of the coating agent or is used as a dispersing medium (sol) for the colloidal particles. There is preferably used methanol, isopropanol, t-butyl alcohol, diacetone alcohol, ethylene glycol monoisopropyl ether, or dioxane. The content of the organic solvent in the coating agent is, usually, 40 to 90% by weight.

As the leveling agent, there can be exemplified sorbitan fatty acid ester, glycerin fatty acid ester, decaglycerin fatty acid ester, propylene glycol, pentaerythritol fatty acid ester, polyoxyethylene sorbitan fatty acid ester, polyoxyethylene sorbit fatty acid ester, polyoxyethylene glycerine fatty acid ester, polyethylene glycol fatty acid ester and polyoxyethylenealkyl ether. The content of the leveling agent is about 0.01 to about 3% by mass per the coating agent.

The curing catalyst accelerates the polycondensation of the hydrolyzed organosilicon compound to cure it. As the curing catalyst, there are preferably used perchlorates such as perhydrochloric acid, ammonium perchlorate and magnesium perchlorate; acetyl acetonatos with Cu(II) Zn(II), Co(II), Ni(II), Be(II), Ce(III), Ta(III), Ti(III), Mn(III), La(III), Cr(III), V(III), Co(III), Fe(III), Al(III), Ce(IV), Zr(IV) and V(IV) as center atoms; amino acids such as amine and glycin; Lewis acid; and organometal salts. These curing catalysts are added in an amount of 0.1 to 3% by weight as solid components to the coating agent.

The inorganic particle dispersion layer 500 has a thickness which is usually 1 to 5 μm.

The above-mentioned inorganic particle dispersion layer 500 can be formed by using a coating agent which is for forming a hard coating on the surfaces of the so-called plastic lenses. The inorganic particle dispersion layer 500, however, is not formed as the hard coating. Therefore, the amount of the inorganic particles in the coating agent may be smaller than the amount of the coating agent for forming the hard coating. When the inorganic particle dispersion layer 500 contains inorganic particles in an amount nearly the same as that of the hard coating, the inorganic particle dispersion layer 500 may, as required, be formed on the surface of the thin metal oxide layer 300 as hard coating.

EXAMPLES

The following photochromic compounds were used in the following Examples and Comparative Examples.

Indenonaphthopyran (a):

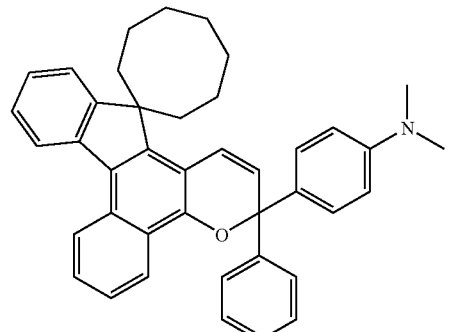

Indenonaphthopyran (b):

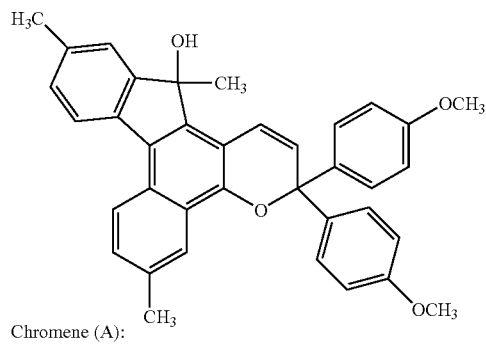

Chromene (A):

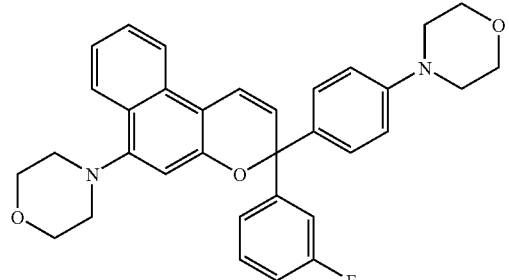

Chromene (B):

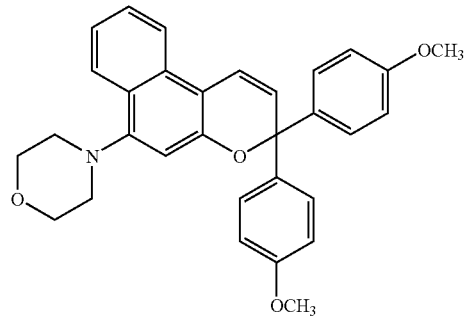

Chromene (C):

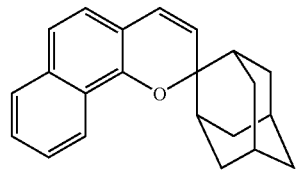

The photochromic optical articles obtained in Examples and in Comparative Examples were measured for their photochromic properties concerning the following items.

(1) Maximum Absorption Wavelength ($\lambda$max):

The samples of photochromic optical articles were irradiated with light for 120 seconds to develop color by using a xenon lamp L-2380 (300 mW) manufactured by Hamamatsu Photonics Co. through an aeromass filter (manufactured by Coning Co.) under the following irradiation conditions.

Light Irradiation Conditions:

Temperature: 20±1° C.

Beam Intensity on the Surface:

365 nm=2.4 mW/cm$^2$ 254 nm=24 $\mu$W/cm$^2$

A maximum absorption wavelength ($\lambda$max) at this moment was found by using a spectrophotometer (instantaneous multi-channel photodetector MCPD1000) manufactured by Otsuka Denshi Kogyo Co. The maximum absorption wavelength is related to a color tone at the time of developing a color.

(2) Color Density (Abs.):

The samples of photochromic optical articles were irradiated with light for 120 seconds in the same manner as described above, the absorbency ($\epsilon_{120}$) at the maximum absorption wavelength ($\lambda$max) was measured, the absorbency ($\epsilon_0$) of the optical articles at the above wavelength but in a state of not being irradiated with light was measured, and a difference ($\epsilon_{120}-\epsilon_0$) between the two was found and was regarded to be a color density A. It can be said that the higher this value, the more excellent the photochromic properties are.

(3) Light Resistance:

The obtained photochromic optical articles were deteriorated for 50 hours in an accelerated manner by using a xenon weather meter, X25 (fadometer) manufactured by Suga Shikenki Co. The color densities were evaluated before and after the accelerated deterioration. The remaining ratio was found in compliance with the following formula, and was used as an index of light resistance of the developed color.

Remaining ratio (%)=($A_{50}/A_0$)×100

$A_0$: Color density before the accelerated deterioration.
$A_{50}$: Color density after the accelerated deterioration.

The higher the remaining ratio, the higher the light resistance of the developed color.

(4) Yellowness (Yellow Index, TI):

The deterioration acceleration testing was conducted for 50 hours in the same manner as described above, and a change ($\Delta$YI) in the yellowness of the photochromic optical articles before and after the accelerated deterioration but before developing color (in a state where the photochromic compounds are not developing color yet) was found according to the following formula, $\Delta YI = YI_{50} - YI_0$ $YI_0$: Yellowness before the accelerated deterioration.
$YI_{50}$: Yellowness after the accelerated deterioration.

The yellowness was measured by using a color-difference meter (SM-4) manufactured by Suga Shikenki Co. The larger the value YI, the stronger the yellowness. The larger the value $\Delta$YI, the larger the difference in the yellowness before and after the deterioration.

(5) Fading Rate:

The samples of photochromic optical articles were irradiated with light for 120 seconds in the same manner as those described above, a time ($t_{1/2}$, minutes) was measured from a moment the irradiation with light was discontinued until when the absorbency of the optical article at the maximum absorption wavelength ($\lambda$max) became one-half the color density A measured earlier, and this time ($t_{1/2}$) was regarded to be the fading rate. The shorter the time ($t_{1/2}$), the more excellent the photochromic properties.

Example 1

A lens material (refractive index=1.50) having a thickness 2 mm made of a cured bisethylene glycol diallyl carbonate was prepared, and a primer PFR4 (urethane primer of the type of curing with moisture) produced by Takebayashi Kagaku Kogyo Co. was prepared as a primer.

The above primer and an ethyl acetate were mixed at a weight ratio of 9:1, and were sufficiently stirred in a nitrogen atmosphere so as to become homogeneous to thereby prepare a primer solution. By using a spin coater (1H-DX2 manufactured by MIKASA Co.), the primer solution was applied onto the surface of the lens material that has been dewaxed with acetone to a sufficient degree, followed by curing at room temperature for 20 minutes to form a primer layer on the surface of the lens material.

Next, a mixture of radically polymerizable monomers of the following composition was prepared:

| | |
|---|---|
| 2,2-Bis(4-methacryloyloxypentaethoxyphenyl)propane; | 50 parts by weight |
| Polyethylene glycol diacrylate (average molecular weight, 532); | 15 parts by weight |
| Trimethylolpropane trimethacrylate; | 15 parts by weight |
| Polyesteroligomer hexaacrylate (EB-1830 produced by Dycell UCB Co.); | 10 parts by weight |
| Glycidyl methacrylate; | 10 parts by weight |

By using the mixture of the above radically polymerizable monomers and the above-mentioned photochromic compound, a photochromic polymerizable composition (photochromic coating solution) of the following recipe was prepared.

| | |
|---|---|
| Mixture of radically polymerizable monomers; | 100 parts by weight |
| Indenonaphthopyran (a); | 2.35 parts by weight |
| Chromene (A); | 0.2 parts by weight |
| Chromene (B); | 1.6 parts by weight |
| Polymerization initiator; | 0.5 parts by weight |
| Bis(1,2,2,6,6-pentamethyl-4-piperidyl)sebacate (stabilizer); | 5 parts by weight |
| $\gamma$-Methacryloyloxypropyltrimethoxysilane (silane coupling agent); | 7 parts by weight |

As the above polymerization initiator, there was used a mixture of 1-hydroxycyclohexylphenyl ketone and bis(2,6-dimethooxybenzoyl)-2,4,4-trimethylpentylphosphinoxide (weight ratio of 3 to 1).

About 2 g of the above photochromic coating solution was applied onto the surface of the lens material (onto the surface of the primer layer) by using the spin-coater. The lens material coated with the photochromic coating solution was irradiated with light for 3 minutes by using a metal halide lamp of an output of 120 mW/cm$^2$ in a nitrogen gas atmosphere to cure the photochromic coating solution, and was further heat-treated in a constant-temperature device heated at 110° C. for one hour to obtain an optical material having a photochromic layer on the surface thereof. The obtained photochromic layer possessed a thickness of 40 μm.

Next, a hard coating solution TS-56H (organosilicon sol; silica content of 50% by mass calculated as the solid component) manufactured by Tokuyama Co. was applied by dipping onto the photochromic layer, and was cured at 120° C. for 2 hours to obtain an inorganic particle dispersion layer having a thickness of 1.6 μm.

Next, a thin silicon oxide layer of a thickness of 0.02 μm was formed by evaporation on the surface of the above inorganic particle dispersion layer to obtain a photochromic optical article. The optical article was evaluated for its photochromic properties according to the above-mentioned methods. The results were as shown in Table 1.

Example 2

A photochromic optical article was produced in the same manner as in Example 1 but forming a thin titanium oxide layer (thickness; 0.02 μm) by evaporation instead of forming the thin silicon oxide layer, and was measured for its photochromic properties. The results were as shown in Table 1.

Example 3

An optical material having a photochromic layer on the surface thereof was prepared in the same manner as in Example 1 but using 1.5 parts by weight of the indenonaphthopyran (a) as a photochromic compound and using neither the chromene (A) nor the chromene (B). A photochromic optical article was produced in the same manner as in Example 1 but using the above photochromic optical material and changing the thickness of the thin silicon oxide layer into 0.1 μm, and was measured for its photochromic properties. The results were as shown in Table 1.

Example 4

A photochromic optical article was produced in the same manner as in Example 3 but forming no inorganic particle dispersion layer and forming a thin silicon oxide layer directly on the photochromic layer, and was measured for its photochromic properties. The results were as shown in Table 1.

Example 5

A photochromic optical article was produced in the same manner as in Example 3 but using, as a photochromic compound, 1.5 parts by weight of the indenonaphthopyran (b) instead of the indenonaphthopyran (a), and was measured for its photochromic properties. The results were as shown in Table 1.

Example 6

A photochromic optical article was produced in the same manner as in Example 5 but forming no inorganic particle dispersion layer and forming a thin silicon oxide layer directly on the photochromic layer, and was measured for its photochromic properties. The results were as shown in Table 1.

Comparative Example 1

A photochromic optical article was produced in the same manner as in Example 1 but forming no thin silicon oxide layer, and was measured for its photochromic properties. The results were as shown in Table 1.

Comparative Example 2

An optical material having a photochromic layer on the surface thereof was prepared in the same manner as in Example 1 but using 1.5 parts by weight of the chromene (A) as a photochromic compound and using neither the indenonaphthopyran (a) nor the chromene (B). A photochromic optical article was produced in the same manner as in Example but using the above photochromic optical material and changing the thickness of the thin silicon oxide layer into 0.1 μm, and was measured for its photochromic properties. The results were as shown in Table 1.

Comparative Example 3

A photochromic optical article was produced in the same manner as in Comparative Example 2 but changing the thickness of the photochromic layer into 19 μm, and was measured for its photochromic properties. The results were as shown in Table 1.

Comparative Example 4

A photochromic optical article was produced in the same manner as in Example 1 but changing the thickness of the photochromic layer into 19 μm, and was measured for its photochromic properties. The results were as shown in Table 1.

Comparative Example 5

The optical material having the photochromic layer on the surface thereof produced in Example 1 was measured in its state for its photochromic properties forming neither the inorganic fine particle dispersion layer nor the thin metal oxide layer on the photochromic layer. The results were as shown in Table 1.

Comparative Example 6

The optical material having the photochromic layer on the surface thereof produced in Example 5 was measured in its state for its photochromic properties forming neither the inorganic fine particle dispersion layer nor the thin metal oxide layer on the photochromic layer. The results were as shown in Table 1.

Comparative Example 7

A photochromic optical article was produced in the same manner as in Example 3 but using 1.5 parts by weight of the chromene C as a photochromic compound, and was measured for its photochromic properties. The results were as shown in Table 1.

TABLE 1

| NO. | Photocromic compound (pts. By wt.) Indinonaphotopyran | Photocromic compound (pts. By wt.) Chromene | Laminated-layer structure Thickness of photochromic layer (μm) | Laminated-layer structure Thickness of inorg. ptcl. dispersion layer (μm) | Laminated-layer structure Thin metal layer (μm) |
|---|---|---|---|---|---|
| Ex. 1 | a (2.35) | A (0.2), B (1.6) | 40 | 1.6 | silicon oxide (0.02) |
| Ex. 2 | a (2.35) | A (0.2), B (1.6) | 40 | 1.6 | titanium oxide (0.02) |
| Ex. 3 | a (1.5) | — | 40 | 1.6 | silicon oxide (0.1) |
| Ex. 4 | a (1.5) | — | 40 | — | silicon oxide (0.1) |
| Ex. 5 | b (1.5) | — | 40 | 1.6 | silicon oxide (0.1) |
| Ex. 6 | b (1.5) | — | 40 | — | silicon oxide (0.1) |
| Comp. Ex. 1 | a (2.35) | A (0.2), B (1.6) | 40 | 1.6 | — |
| Comp. Ex. 2 | — | A (1.5) | 40 | 1.6 | silicon oxide (0.1) |
| Comp. Ex. 3 | — | A (1.5) | 19 | 1.6 | silicon oxide (0.1) |
| Comp. Ex. 4 | a (2.35) | A (0.2), B (1.6) | 19 | 1.6 | silicon oxide (0.02) |
| Comp. Ex. 5 | a (2.35) | A (0.2), B (1.6) | 40 | — | — |
| Comp. Ex. 6 | b (1.5) | — | 40 | — | — |
| Comp. Ex. 7 | — | C (1.5) | 40 | 1.6 | silicon oxide (0.1) |

| NO. | Photochromic property Max. absorption wavelength (nm) | Color density (Abs.) | Fading rate (min.) | Yellowness befor deteriorated YI (0) | Light resistance afeter 50 hrs. using weather meter remaining ratio (%) | Light resistance afeter 50 hrs. using weather meter Increase in yellowness ΔYI (YI(50) − YI(0)) |
|---|---|---|---|---|---|---|
| Ex. 1 | 590 | 0.87 | 1.6 | 3.3 | 74 | 2.3 |
| Ex. 2 | 588 | 0.71 | 1.7 | 3.5 | 81 | 2.1 |
| Ex. 3 | 592 | 0.62 | 1.5 | 0 | 85 | 1 |
| Ex. 4 | 588 | 0.65 | 3.2 | 0 | 85 | 1.1 |
| Ex. 5 | 570 | 0.42 | 4.8 | −0.3 | 82 | 1.3 |
| Ex. 6 | 570 | 0.45 | 5.3 | −0.2 | 83 | 1.2 |
| Comp. Ex. 1 | 590 | 0.88 | 1.7 | 3.4 | 73 | 10 |
| Comp. Ex. 2 | 478 | 0.4 | 2.6 | 7 | 58 | 5 |
| Comp. Ex. 3 | 478 | 0.18 | 2.8 | 3.2 | 30 | 5.5 |
| Comp. Ex. 4 | 590 | 0.53 | 1.5 | 1.8 | 52 | 3 |
| Comp. Ex. 5 | 590 | 0.9 | 1.7 | 3.2 | 68 | 11.3 |
| Comp. Ex. 6 | 570 | 0.43 | 5.3 | −0.3 | 55 | 9.8 |
| Comp. Ex. 7 | 470 | 0.36 | 11.5 | 4.2 | 42 | 7.2 |

Example 7

As a lens material, there was prepared a commercially available thiourethane-type plastic lens (refractive index=1.60) having a thickness of 2 mm. The lens material was dewaxed with acetone to a sufficient degree, immersed in an aqueous solution containing 10% by weight of sodium hydroxide maintained at 60° C. for 10 minutes so as to be etched with an alkali.

Next, a photochromic polymerizable composition (photochromic coating solution) was prepared in quite the same manner as in Example 1 but using a silane coupling agent instead of the γ-glycidoxypropylmethoxysilane, and was applied by spin-coating onto the surface of the lens material that has been etched with the alkali. The lens material coated with the photochromic coating solution was irradiated with light for 5 minutes in a nitrogen gas atmosphere by using a metal halide lamp of an output of 100 mW/cm² to cure the photochromic coating solution, followed by the heat-treatment by using a constant-temperature device heated at 120° C. for one hour to obtain an optical material having a photochromic layer on the surface thereof. The obtained photochromic layer possessed a film thickness of 30 μm.

The above lens material having the photochromic layer was immersed in an aqueous solution containing 10% by weight of sodium hydroxide maintained at 60° C. for 10 minutes so as to be etched with an alkali. A polysilazane was applied onto the photochromic layer of the lens material by dip-coating by using a palladium catalyst-type polysilazanexylene solution (solid content of 3%, trade name "NL110A", manufactured by CLARIANT Japan Co. After applied, polysilazanexylene solution was pre-cured at 70° C. for 10 minutes so as to be rendered tack-free, and was heat-treated at 120° C. for one hour and was, then, humidified at 95° C. with a humidity of 80% for 8 hours to convert polysilazane film into a silicon oxide layer (polysiloxane film) to obtain a photochromic optical article having a silicon oxide layer on the surface thereof. The obtained silicon oxide layer possessed a thickness of 0.04 μm.

The optical article exhibited transparent appearance, and cloudiness or whitening was not observed by eyes. The photochromic properties were evaluated in the same manner as in Example 1. The results were as shown in Table 2.

Example 8

An optical material having a photochromic layer (thickness; 40 μm) on the surface thereof was obtained in the same manner as in Example 1.

On the photochromic layer of the optical material, a silicon oxide layer (thickness; 0.04 μm) was formed by converting polysilazane film in quite the same manner as in Example 7 to thereby obtain a photochromic optical article having a silicon oxide layer on the surface thereof.

The optical article exhibited transparent appearance, and cloudiness or whitening was not observed by eyes. The photochromic properties were evaluated in the same manner as in Example 1. The results were as shown in Table 2.

Example 9

An optical material having a photochromic layer on the surface thereof was obtained in the same manner as in Example 1 but changing the thickness of the photochromic layer to 31 μm.

On the photochromic layer of the optical material, a silicon oxide layer (thickness; 0.02 μm) was formed by converting polysilazane film in quite the same manner as in Example 7 but using a palladium catalyst-type polysilazanexylene solution of a solid content of 5% to thereby obtain a photochromic optical article having a silicon oxide layer on the surface thereof.

The optical article exhibited transparent appearance, and cloudiness or whitening was not observed by eyes. The photochromic properties were evaluated in the same manner as in Example 1. The results were as shown in Table 2.

Example 10

An optical material having a photochromic layer on the surface thereof was obtained in the same manner as in Example 1 but changing the thickness of the photochromic layer to 30 μm.

On the photochromic layer of the optical material, a silicon oxide layer (thickness; 0.1 μm) was formed by converting polysilazane film in quite the same manner as in Example 5 but using a palladium catalyst-type polysilazanexylene solution of a solid content of 10% to thereby obtain a photochromic optical article having a silicon oxide layer on the surface thereof.

The optical article exhibited transparent appearance, and cloudiness or whitening was not observed by eyes. The photochromic properties were evaluated in the same manner as in Example 1. The results were as shown in Table 2.

Example 11

An optical material having a photochromic layer on the surface thereof was obtained in the same manner as in Example 1 but changing the thickness of the photochromic layer to 30 μm.

On the photochromic layer of the optical material, a silicon oxide layer (thickness; 1.0 μm) was formed by converting polysilazane film in quite the same manner as in Example 7 but using a palladium catalyst-type polysilazanexylene solution of a solid content of 20% to thereby obtain a photochromic optical article having a silicon oxide layer on the surface thereof.

The optical article exhibited transparent appearance, and cloudiness or whitening was not observed by eyes. The photochromic properties were evaluated in the same manner as in Example 1. The results were as shown in Table 2.

TABLE 2

| | Photocromic compound (pts. By wt.) | | Laminated-layer structure | |
|---|---|---|---|---|
| | | | Thickness of photochromic layer (μm) | Thickness of photochromic silicon oxide layer (μm) |
| NO. | Indinonaphotopyran | Chromene | | |
| Ex. 7 | a(2.35) | A(0.2), B(1.6) | 30 | 0.04 |
| Ex. 8 | a(2.35) | A(0.2), B(1.6) | 40 | 0.04 |
| Ex. 9 | a(2.35) | A(0.2), B(1.6) | 31 | 0.02 |
| Ex. 10 | a(2.35) | A(0.2), B(1.6) | 30 | 0.1 |
| Ex. 11 | a(2.35) | A(0.2), B(1.6) | 30 | 1 |

| | Photochromic property | | | | |
|---|---|---|---|---|---|
| | | | | Light resistance after 50 hrs. using weather meter | |
| NO. | Max. absorption wavelength (nm) | Color density (Abs.) | Yellowness befor deteriorated YI(0) | remaining ratio (%) | Increase in yellowness ΔYI(YI(50) − YI(0)) |
| Ex. 7 | 590 | 0.82 | 4.2 | 90 | 2.3 |
| Ex. 8 | 590 | 0.88 | 4.5 | 92 | 2.5 |
| Ex. 9 | 590 | 0.83 | 4.2 | 88 | 4 |
| Ex. 10 | 592 | 0.82 | 4.2 | 92 | 1.8 |
| Ex. 11 | 590 | 0.81 | 4.2 | 93 | 1.3 |

The invention claimed is:

1. A photochromic optical article comprising an optical substrate having a photochromic layer which is formed on at least one surface thereof and contains a photochromic compound is dispersed in a resin, and thin metal oxide layer formed on said photochromic layer, wherein an indenonaphthopyran compound represented by following formula (8) is used as said photochromic compound;

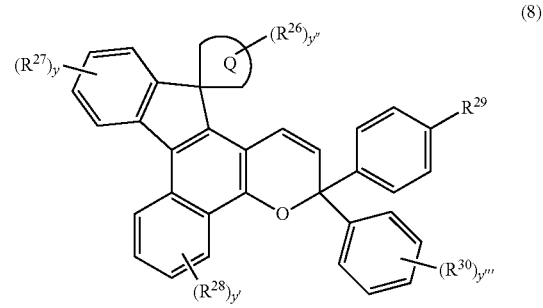

wherein,
$R^{26}$, $R^{27}$, $R^{28}$ and $R^{30}$ are respectively, hydroxyl groups, alkyl groups, trifluoromethyl groups, alkoxy groups, alkoxycarbonyl groups, a carboxyl groups, alkoxymethyl groups, hydroxymethyl groups, aralkoxy groups, amino groups, substituted amino groups, cyano groups, nitro groups, halogen atoms, aralkyl groups, substituted or unsubstituted aryl groups, substituted or unsubstituted heteroaryl groups, substituted or unsubstituted heterocyclic groups having a nitrogen atom as a hetero atom and in which the nitrogen is bonded to the indenonaphtho ring, or condensed heterocyclic groups in which the heterocyclic group is condensed with an aromatic hydrocarbon ring or with an aromatic heterocyclic ring, $R^{29}$ is a dialkylamino group, or a substituted or unsubstituted heterocyclic group having a nitrogen atom as a hetero atom and in which the hydrogen atom is bonded to the phenyl group, ring q is an aliphatic hydrocarbon cyclic group, and y, y', y" and y''' are respectively, integers of 0 to 2, said photochromic layer has a thickness of 30 to 50 μm;

said thin metal oxide layer is formed by evaporation, has a thickness of 0.01 to 10 μm, is of a single-layer structure or of a laminated-layer structure of not more than three layers, and is formed on the photochromic layer via a buffer layer of a thickness of 0.1 to 20 μm; and said buffer layer has an inorganic particle dispersion layer which contains inorganic particles in an amount of larger than 30% by mass but not larger than 60% by mass and is formed by dispersing said inorganic particles in a binder resin;

wherein said thin metal oxide layer is formed by silicon oxide, titanium oxide, zirconium oxide, tin oxide, zinc oxide, cerium oxide, iron oxide or a composite oxide containing these oxide components.

2. The photochromic optical according to claim 1, wherein said thin metal oxide layer is formed by silicon oxide.

3. The photochromic optical article according to claim 1, wherein said inorganic particles contained in the inorganic particle dispersion layer is silicon oxide, titanium oxide, zirconium oxide, tin oxide, zinc oxide, cerium oxide, iron oxide or a composite oxide containing these oxide components.

4. The photochromic optical article according to claim 1, wherein said binder resin in the inorganic particle dispersion layer is formed by the hydrolysis and condensation of an organosilicon compound.

5. The photochromic optical article according to claim 1, wherein said buffer layer comprises a primer layer formed on said photochromic layer and said inorganic particle dispersion layer formed on said primer layer.

6. A photochromic optical article comprising an optical substrate having a photochromic layer which is formed on at least one surface thereof and contains a photochromic compound dispersed in a resin, and thin metal oxide layer formed on said photochromic layer,
wherein an indenonaphthopyran compound is used as said photochromic compound, said photochromic layer has a thickness of 30 to 50 μm, and
said thin metal oxide layer comprises a silicon oxide layer having a thickness of 0.01 to 10 μm, said silicon oxide layer being formed by converting polysilazane in a thin polysilazane layer formed on the photochromic layer into silicon oxide.

7. A method of producing a photochromic optical article, comprising:
preparing an optical substrate having a photochromic layer of a thickness of 30 to 50 μm formed on at least one surface thereof and in which an indenonaphthopyran compound is dispersed in a resin;
forming a thin polysilazane layer on said photochromic layer by applying a coating solution containing at least a polysilazane followed, as required, by drying; and
converting polysilazane forming said thin layer into silicon oxide to thereby form a thin silicon oxide layer of a thickness of 0.01 to 10 μm.

* * * * *